Aug. 25, 1953  C. A. SHERMAN  2,649,875
HOLDDOWN SHOE FOR LUMBER TRIMMING AND MARKING MACHINES
Filed June 13, 1950  2 Sheets-Sheet 1

INVENTOR.
Charles A. Sherman
BY
Cook and Schermerhorn
ATTORNEYS

Aug. 25, 1953 — C. A. SHERMAN — 2,649,875
HOLDDOWN SHOE FOR LUMBER TRIMMING AND MARKING MACHINES
Filed June 13, 1950 — 2 Sheets-Sheet 2
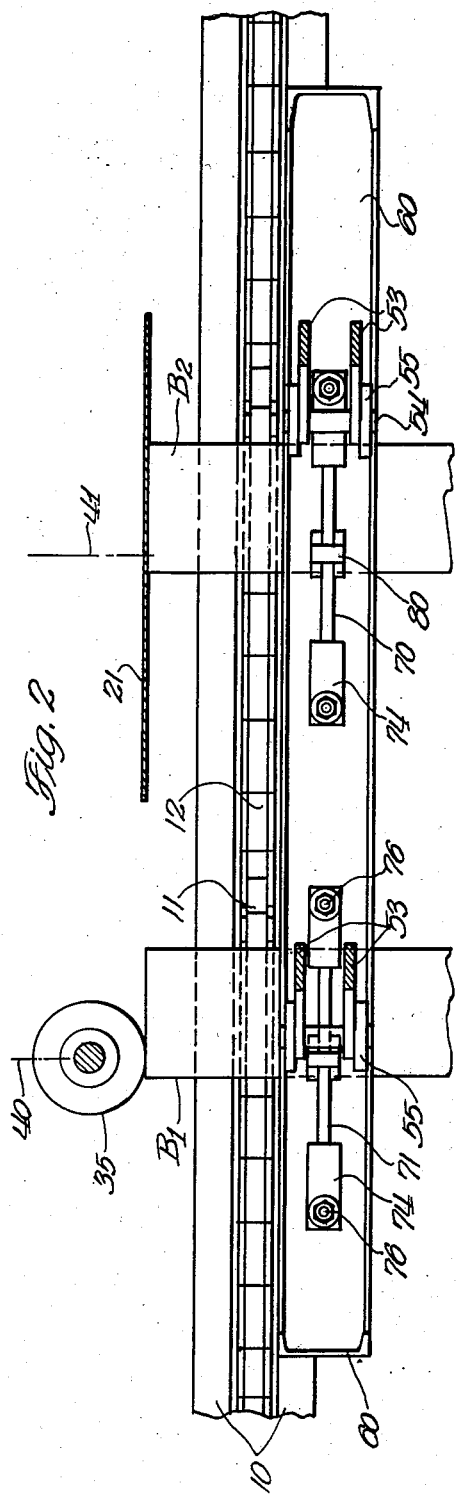
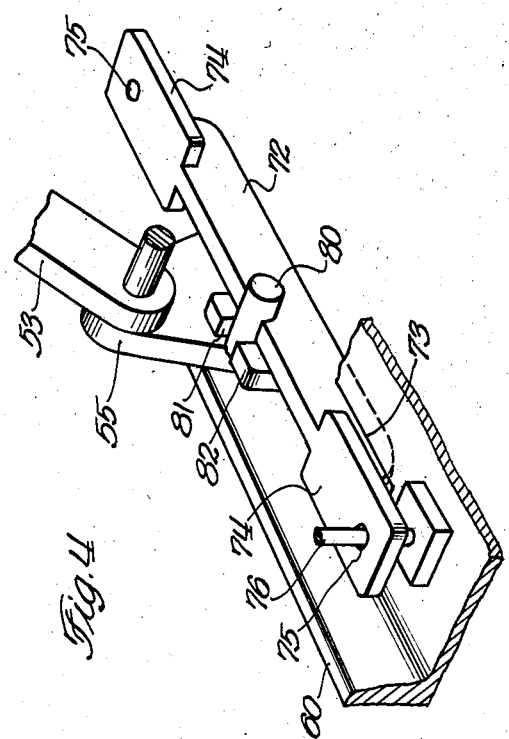
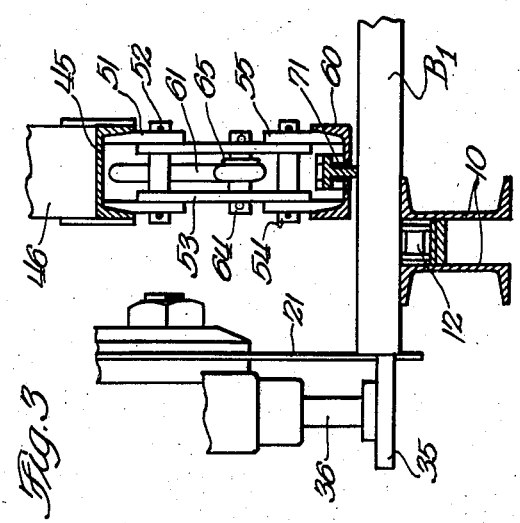
INVENTOR.
Charles A. Sherman
BY
Cook and Schermerhorn
ATTORNEYS Patented Aug. 25, 1953

2,649,875

UNITED STATES PATENT OFFICE 2,649,875

HOLDDOWN SHOE FOR LUMBER TRIMMING AND MARKING MACHINES

Charles A. Sherman, Tacoma, Wash., assignor to Weyerhaeuser Timber Company, Tacoma, Wash., a corporation of Washington Application June 13, 1950, Serial No. 167,882

7 Claims. (Cl. 144—242)

This invention relates to a hold-down shoe for an improved lumber trimming and marking machine of the general type illustrated in the patent to A. H. Onstad, No. 1,894,415, entitled Lumber Retrimming Machine.

For a more general disclosure of the present improved machine as a whole, reference is made to copending application Serial No. 167,877, filed June 13, 1950, and assigned to the assignee of the present application. In this type of trimming, or retrimming, machine, the lumber to be trimmed is moved flatwise on supporting skids by suitable conveyor means to pass between a pair of circular saws which cut off the ends of the pieces of lumber square and true. The saws are precisely positioned to cut the lumber with the least waste to some standard length, and immediately after the sawing operation a pair of end printing mechanisms prints a trade-mark or other information on the freshly cut ends of the lumber. The printing mechanism is arranged to operate automatically upon the arrival of each piece of lumber at the printing station, without any delay or interruption to the steady movement of the lumber through the machine.

The general object of the present invention is to provide an improved hold-down shoe to hold the pieces of lumber, or boards, flat against the skids of the machine as the pieces pass between the saws and between the end printers. An important object is to provide a hold-down shoe which will accommodate itself to varying thicknesses of lumber in such a manner as to hold a thin piece of lumber flat against the skids while a portion of the shoe is resting upon a thicker piece of lumber. Further objects are to provide a main shoe of sufficient length to engage the lumber throughout its passage between the saws and the end printers wherein said main shoe is equipped with shorter auxiliary shoes alongside the trimming saws and end printers so that each piece of lumber is held down individually without regard to its relative thickness, within the limits of the apparatus. Other objects are to provide a main hold-down shoe having a plurality of auxiliary shoes mounted for lifting and rocking movements on the main shoe, and to correlate the spacing of the auxiliary shoes and also the flight lugs on the conveyor chains with the spacing between the sawing and end printing stations in the machine.

These and other objects will become apparent and the invention will be better understood with reference to the preferred embodiment of apparatus described in the following specification and illustrated in the accompanying drawings. It is to be understood, however, that various changes may be made in the construction and arrangement of parts, and that certain features may be used without others without departing from the spirit of the invention.

In the drawings:

Figure 2 is a plan view of the shoe taken on the line 2—2 of Figure 1;

Figure 3 is a sectional view in elevation taken on the line 3—3 of Figure 1; and Figure 4 is a fragmentary perspective view with parts broken away to show the mounting of one of the auxiliary shoes in the main shoe.

Figure 1:
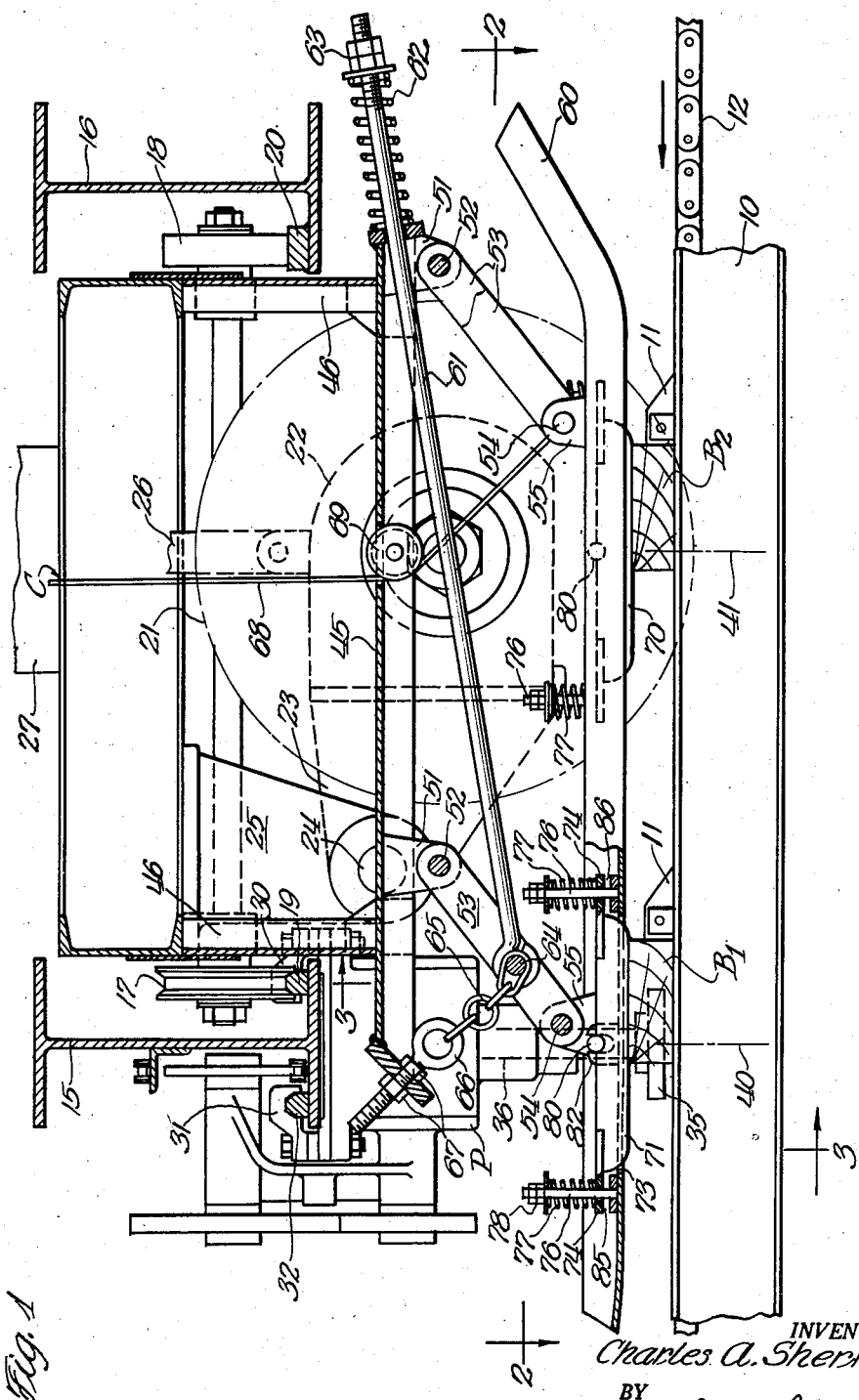
Figure 1 is a fragmentary longitudinal sectional view of a portion of the trimming and marking machine illustrated in application Serial No. 167,877, showing the construction and arrangement of the present hold-down shoe.

The trimming and marking machine has a lower frame comprising a series of longitudinal beams 10 having their top surfaces disposed in a common horizontal plane to form skids for the pieces of lumber or boards indicated at B₁ and B₂. Edgewise movement is imparted to these pieces of lumber on the skids 10 by means of spaced flight lugs 11 on a series of parallel conveyor chains 12. Above the skid beams 10 is an upper frame comprising a pair of transverse track beams 15 and 16 extending across the machine to support a saw carriage C, an end printer carriage P, and auxiliary apparatus. The carriage C is equipped with wheels 17 and 18 to roll on the tracks 19 and 20 and carries one or more circular trimming saws 21. The saw 21 in the present illustration is driven by an electric motor 22 having a bracket 23 pivotally mounted on a horizontal shaft 24 supported by depending brackets 25 under the frame of the carriage. The motor and saw are lifted by a link 26 which is connected with a lifting mechanism actuated by a vertical thrusting unit 27, shown in greater detail in application Serial No. 167,878, filed June 13, 1950, so that the saw will clear the skids 10 and flight lugs 11 when the carriage is traversed on its tracks 19 and 20.

The end printer carriage P is connected with the saw carriage C for corresponding traverse movements, the printer being supported in part by a shoe 30 riding on the rail 19 and a shoe 31 riding on a rail 32. The printing operation upon the freshly cut ends of the lumber is performed by a rotary printing die 35 mounted on the lower end of a vertical shaft 36 in the printing mechanism. It is to be noted that the axis 40 of the printing die 35 and shaft 36 determines the position of a vertical transverse plane which will hereinafter be referred to as the printing station. It will be observed that the vertical plane, or station, 40 is some distance behind a vertical plane 41 through the saw axis, which, for convenience, will be referred to as the sawing station. The distance between the stations 40 and 41 is preferably made approximately equal to the spacing of the flight lugs 11 on the chains 12, or approximately equal to some integer multiple of the flight spacing, so that boards of the same width will arrive at the two stations simultaneously. The details of the printing mechanism are immaterial to the present invention but it is explained that the mechanism includes means for raising the die 35 to clear the lugs 11 when the carriages are traversed.

The hold-down shoe and its actuating mechanism are mounted on an inverted channel frame member 45 attached to brackets 46 on the bottom of the carriage C. Depending ears 51 carry pins 52 for pivotally mounting two pairs of parallel arms 53. The lower ends of arms 53 are pivotally mounted on pins 54 in upstanding ears 55 on a main shoe 60. The main shoe 60 is drawn down toward the lumber on the skids 10 in parallel motion by means of a rod 61 tensioned by a compression spring 62. The force exerted by spring 62, and hence the hold-down effort exerted by the main shoe 60, may be varied by adjusting nuts 63 on the threaded upper end of the rod 61. The lower end of rod 61 is connected between the rear pair of arms 53 by means of a pin 64 which also receives one end of a stop chain 65. The other end of chain 65 is anchored by an eye bolt 66 which is secured to a part of the frame 45 in adjusted position by means of nuts 67.

The shoe 60 is lifted along with the saw, or saws, for traversing the carriage. A chain or cable 68 having its lower end attached to the front pin 54 is trained over pulley 69 and connected with the saw lifting mechanism actuated by thrusting unit 27. Chain 68 has sufficient length to avoid limiiting the downward movement of the shoe to engage the thinnest boards to be sawed and marked.

The main shoe 60 is made of channel stock and is equipped with identical front and rear auxiliary shoes 70 and 71. Each auxiliary shoe has a vertical runner 72 extending through a longitudinal slot 73 in the bottom of the main shoe, and flat horizontal end portion 74 confined within the channel of the main shoe. Each flat end portion 74 has a hole 75 to fit loosely over an upstanding guide stud 76 on the main shoe. Springs 77 bear against the flat end portions 74 to urge the runner 71 downwardly to project beneath the bottom surface of the main shoe, the tension of the springs being adjustable by means of nuts 78 on threaded upper ends of the studs. Each auxiliary shoe also has an integral trunnion 80 with its ends confined in vertical guide slots 81 in upstanding ears 82 integrally secured within the channel of the main shoe. The parts are so proportioned and mounted that the trunnion 80 of the front auxiliary shoe falls approximately on the vertical line or plane 41 indicating the saw station, and the trunnion 80 of the rear auxiliary shoe falls in the vertical plane 40 which designates the printer station.

Hence, boards of the same width being advanced by two successive flight lugs 11 will reach the respective auxiliary shoes 70 and 71 at the same instant. The ends of the runners 72 are rounded to ride over the advancing boards, and the four springs 77 are adjusted so that the auxiliary shoes will be lifted for some distance relative to the main shoe before the main shoe itself is lifted against the force of spring 62. The lifting of the auxiliary shoe 71 relative to the main shoe is indicated in Figure 1 by the presence of a gap at 85 under the flat portion 74 at the rear end of the auxiliary shoe and by the gap 86 under the flat portion 74 at the front end of the auxiliary shoe. If one of the boards $B_1$ or $B_2$ is thicker than the other, the auxiliary shoe bearing on the thicker board will be elevated more in relation to the main shoe to increase the gaps at 85 and 86 without lifting the other auxiliary shoe off the thinner board. Even when the main shoe is raised slightly by the presence of an unusually thick board, it will be apparent that the springs 77 can move the other auxiliary shoe down into firm engagement with the thinner board within the intended range of movement.

If the top surface of any board is not horizontal and parallel with the under side of the main shoe 60, the holes 75 are sufficiently large to permit rocking of the auxiliary shoes upon their trunnions 80 as such boards pass under. This rocking motion also assists the auxiliary shoes in riding over the approaching edge of each board. Thus, under all conditions of irregularity normally encountered in a trimming and marking machine, the auxiliary shoes maintain flat and firm contact with the top surfaces of the boards as they pass the sawing and printing stations to hold them substantially flat against the skids 10 and pressed against the lugs 11 for proper sawing and printing actions.

By locating the trunnions 80 of the auxiliary shoes approximately at the sawing and printing stations 40 and 41, respectively, the maximum hold-down effort is obtained at the points where it is most needed, and by spacing flight lugs 11 the same distance apart on the conveyor chains 12, each two consecutive boards of the same width encounter the auxiliary shoes 70 and 71 at the same instant, rocking them slightly and tending to lift both ends of the main shoe 60 slightly in parallel motion, so that the hold-down pressure will not be relieved momentarily on any board which is already at the printing station and in the process of being printed. There is no movement of the main shoe while a board is being printed. The printed mark is, therefore, always clear and distinct and not slightly blurred or twisted as would be the case with a thin or warped board if the hold-down pressure were relaxed to some extent during the printing operation. The rear auxiliary shoe 71 extends well to the rear of the printing die 35, and it will be observed that the boards $B_1$ and $B_2$ will leave their respective auxiliary shoes also at the same instant, so that there is likewise no increase of pressure on the board at the printing station while the printing operation is still in process. Thus, the present improved hold-down shoe enables clear, distinct printing to be obtained on thick, thin and warped board ends when the printer is closely associated with the saw carriage for the greatest convenience in traversing the printer and carriage together.

It will be understood that in a lumber trimming and marking machine of the type described there is also a saw and end printer mounted on stationary supports at one end of the upper frame beams 15 and 16 at the same sawing and printing stations whereby both ends of each board are trimmed at the same time as the board passes the sawing station 41, and subsequently both ends are printed at the same time as the board passes the printing station 40. A second hold-down shoe 69, equipped with auxiliary shoes 70 and 71 is, therefore, mounted on stationary supports adjacent the stationary saw and printer to hold the other ends of the boards flat against the skids in the manner described as the said other ends are sawed and printed. Lifting cable 68 is not required on this shoe. The arrangement and purpose of the second hold-down shoe will, therefore, be obvious to a person skilled in the art without duplicating the showing of the one shoe.

Having now described my invention and in what manner the same may be used, what I claim as new and desire to protect by Letters Patent is:

1. In a lumber trimming and marking machine having a sawing station and an end printing station spaced more than a bored width apart and skids and conveyor chains for supporting and moving boards edgewise past said stations to saw and print the ends of boards, board engaging lugs spaced apart on said conveyor chains a distance equal to the distance between said two stations to introduce two successive boards to said two stations simultaneously, a main hold-down shoe extending from a point in front of said sawing station to a point behind said printing station, and an auxiliary shoe resiliently mounted on said main shoe at each of said stations, said auxiliary shoes being longitudinally centered at said stations and each auxiliary shoe having a flat board engaging surface of a length at least approximately equal to the width of the boards to press the boards flat on said skids at each of said stations.

2. In a lumber trimming and marking machine having an upper frame carrying a saw carriage and an end printer movable with said saw carriage, and a lower frame having skids and conveyor chains for supporting and moving boards edgewise past said stations to saw and print the ends of boards, the end printer and the saw on said carriage being spaced more than a board width apart in the direction of travel of the boards; board engaging lugs spaced apart on said conveyor chains a distance equal to the center line distance between said end printer and the carriage saw to introduce two successive boards to the saw and end printer simultaneously, a main hold-down shoe mounted for vertical movement on said carriage and extending from a point in front of said saw to a point behind said printer, an auxiliary shoe longitudinally centered on the center line of said saw resiliently mounted on said main shoe, and an auxiliary shoe longitudinally centered on the center line of said printer resiliently mounted on said main shoe, each of said auxiliary shoes having a flat board engaging surface of a length at least approximately equal to the width of the boards to press the boards flat against said skids while they are being treated by said saw and said printer.

3. In a lumber trimming and marking machine and the like, an elongated main hold-down shoe having a channel shaped cross section, a flat work engaging bottom wall on said shoe having a pair of longitudinally spaced longitudinal slots, a pair of auxiliary shoes resiliently mounted on said shoe within said channel and spring actuated to project through said slots, the projecting portions of said auxiliary shoes having elongated, flat, work engaging surfaces, and stops on said auxiliary shoes within said channel engaging said bottom wall to hold the work engaging surfaces of said auxiliary shoes normally projected in parallel spaced relation with said bottom wall of said main shoe.

4. In a lumber trimming and marking machine and the like, an elongated main hold-down shoe, a flat work engaging bottom surface on said shoe having a pair of longitudinally spaced longitudinal slots, and a pair of auxiliary shoes mounted in said slots for lifting and rocking movements relative to said main shoe, end portions on said auxiliary shoes extending beyond the ends of said slots to engage said main shoe, an elongated flat work engaging surface on each of said auxiliary shoes projecting through said slots, and springs engaging said extending end portions of each auxiliary shoe to urge said end portions against said main shoe and hold the flat work engaging surface of the auxiliary shoe normally projected in parallel spaced relation with said bottom surface of said main shoe.

5. In a lumber trimming and marking machine and the like, an elongated main hold down shoe, a work engaging bottom wall on said shoe having a pair of longitudinally spaced longitudinal slots, a pair of auxiliary shoes mounted in said slots for lifting and rocking movements relative to said main shoe, end portions on said auxiliary shoes engaging said bottom wall of the main shoe adjacent said slots, an elongated work engaging surface on each of said auxiliary shoes projecting through the slot, and springs engaging said auxiliary shoes to urge said end portions against said wall and hold the work engaging surfaces of the auxiliary shoes normally projected in parallel spaced relation with the work engaging surface of said bottom wall of the main shoe.

6. In a lumber trimming and marking machine and the like, an elongated main hold down shoe, a work engaging bottom wall on said shoe having a pair of longitudinally spaced longitudinal slots, a pair of auxiliary shoes mounted in said slots for lifting and rocking movements relative to said main shoe, end portions on said auxiliary shoes extending beyond the ends of said slots to engage said wall, an elongated work engaging surface on each of said auxiliary shoes projecting through said slots, guide holes in said end portions of said auxiliary shoes, guide studs on said bottom wall of the main shoe extending through said guide holes, and springs on said studs engaging said end portions of the auxiliary shoes to urge said end portions against said bottom wall of the main shoe and to hold the work engaging surfaces of the auxiliary shoes normally projected in parallel spaced relation with said bottom wall of said main shoe.

7. In a lumber trimming and marking machine and the like having means to move spaced boards in an edgewise direction on horizontal supporting means; an elongated horizontal main hold down shoe mounted for parallel movement in a vertical plane parallel with said direction of movement, spring means urging said main shoe downwardly, a pair of elongated horizontal auxiliary shoes spaced apart longitudinally on said main shoe a distance approximately equal to the length of an auxiliary shoe and mounted on said main shoe for relative lifting and rocking movements, longitudinally flat runner surfaces on said auxiliary shoes, spring means urging said auxiliary shoes downwardly to project said runner surfaces beneath said main shoe, and a continuous longitudinally flat runner surface on said main shoe extending forwardly and rearwardly beyond the ends of said auxiliary shoes to engage boards approaching and leaving said auxiliary shoes.

CHARLES A. SHERMAN.

References Cited in the file of this patent

UNITED STATES PATENTS

| Number | Name | Date |
|---|---|---|
| 183,418 | Rait et al. | Oct. 17, 1876 |
| 851,302 | McClune | Apr. 23, 1907 |
| 1,413,201 | Tingleaf | Apr. 18, 1922 |
| 1,700,400 | Carlson et al. | Jan. 29, 1929 |
| 1,802,514 | Johnson | Apr. 28, 1931 |
| 1,894,415 | Onstad | Jan. 17, 1933 |
| 1,977,971 | Payzant et al. | Oct. 23, 1934 |
| 2,387,446 | Herz | Oct. 23, 1945 |
| 2,525,894 | Graham | Oct. 17, 1950 |